(12) United States Patent
Himmelmann et al.

(10) Patent No.: US 7,646,124 B2
(45) Date of Patent: Jan. 12, 2010

(54) MAGNET RETENTION SYSTEM FOR PERMANENT MAGNET MOTORS AND GENERATORS

(75) Inventors: Richard A. Himmelmann, Beloit, WI (US); Mohammad Shahamat, Rockton, IL (US)

(73) Assignee: Hamilton Sundstrand Corporation, Rocford, IL (US)

( * ) Notice: Subject to any disclaimer, the term of this patent is extended or adjusted under 35 U.S.C. 154(b) by 366 days.

(21) Appl. No.: 11/706,881

(22) Filed: Feb. 15, 2007

(65) Prior Publication Data
US 2008/0197736 A1 Aug. 21, 2008

(51) Int. Cl.
*H02K 21/12* (2006.01)
(52) U.S. Cl. .............. 310/156.28; 310/156.01
(58) Field of Classification Search ............ 310/156.01, 310/156.08, 156.12–156.14, 156.26–156.31, 310/261, 254
See application file for complete search history.

(56) References Cited

U.S. PATENT DOCUMENTS

| | | | |
|---|---|---|---|
| 5,168,946 A | 12/1992 | Dorgan | |
| 5,331,244 A * | 7/1994 | Rabe | 310/180 |
| 5,578,878 A | 11/1996 | Hall | |
| 5,578,885 A | 11/1996 | Alford et al. | |
| 5,874,796 A | 2/1999 | Petersen | |
| 5,998,902 A * | 12/1999 | Sleder et al. | 310/153 |
| 6,552,459 B2 * | 4/2003 | Burton | 310/156.08 |
| 6,555,941 B1 | 4/2003 | Zepp et al. | |
| 6,603,232 B2 * | 8/2003 | Van Dine et al. | 310/156.01 |
| 6,661,132 B2 * | 12/2003 | Kobayashi | 310/51 |
| 6,894,418 B2 | 5/2005 | Jones et al. | |
| 6,933,645 B1 * | 8/2005 | Watson | 310/156.09 |
| 6,943,478 B2 | 9/2005 | Zepp et al. | |
| 7,030,529 B2 | 4/2006 | Dommsch et al. | |
| 7,030,530 B2 * | 4/2006 | Malmberg | 310/156.28 |
| 7,074,151 B2 | 7/2006 | Thompson | |
| 7,218,025 B1 * | 5/2007 | McDonald | 310/90.5 |
| 2006/0220483 A1 | 10/2006 | Jones et al. | |
| 2007/0052312 A1 | 3/2007 | Stanetskiy et al. | |

FOREIGN PATENT DOCUMENTS

EP 1646125 4/2006

* cited by examiner

*Primary Examiner*—Thanh Lam
(74) *Attorney, Agent, or Firm*—Kinney & Lange, P.A.

(57) ABSTRACT

A rotor for a brushless permanent magnet generator/motor comprises a retention slot extending into a rotor flange for receiving a root of a permanent magnet. The retention slot comprises a base extending axially into the rotor flange, a pair of side walls extending radially from the base, and a pair of lugs projecting from the side wall to engage the root to provide radial and tangential retention of the permanent magnet. In other embodiments, the permanent magnet is further restrained in the axial direction by a spring pre-loaded axial retention ring.

25 Claims, 5 Drawing Sheets

US 7,646,124 B2

MAGNET RETENTION SYSTEM FOR PERMANENT MAGNET MOTORS AND GENERATORS

BACKGROUND OF THE INVENTION

This invention relates generally to rotors for permanent magnet (PM) motors and generators. More particularly, the present invention relates to retention systems for rotor magnets in brushless PM motors and generators.

Brushless PM motors convert electrical energy to kinetic energy by exploiting the electromagnetic relationship between a magnet and an electric field. Conversely, brushless PM generators use electromagnetic relationships to convert kinetic energy to electrical energy. In a typical brushless PM motor, electric current is passed through stationary windings of conductive wires to generate an alternating magnetic field to push and/or pull a magnetic rotor. The magnetic rotor is coupled to a shaft to produce rotational shaft power. In a typical brushless PM generator, a mechanically rotating shaft rotates a magnetic rotor to push electrical current through a stationary coil. The electrical current is then available to provide electric power. Thus, brushless PM motors and generators comprise two main concentrically aligned components: a stator, comprising wire windings, and a rotor, comprising permanent magnets. Brushless PM motors and generators can be configured in a conventional design, with the stator surrounding the rotor, or in an inside out design, with the rotor surrounding the stator. In either case, the rotor is subjected to extremely high rotational speeds, which places significant mechanical loading on the magnets.

A rotor of a brushless PM motor or generator must meet multiple requirements in order to efficiently convert electromagnetic power to or from rotational shaft power. First, the rotor must include magnets that are able to convert electromagnetic force to or from mechanical force. Second, the magnets need to be magnetically coupled in order to produce a magnetic flux path between adjacent magnets. Third, the magnets must be connected to a shaft in such a manner to transmit the torque necessary for inputting or outputting the mechanical power.

For both conventional and inside out brushless PM motor and generator designs, various prior art systems for retaining the magnets with respect to the rotor have been developed. For example, in inside out brushless PM motor and generator designs, the rotor comprises a disk having a central bore for receiving a shaft and an outer diameter flange for receiving the permanent magnets. The permanent magnets are circumferentially arranged around the inner diameter face of the flange such that they will face the wire windings when coupled with the stator. Conventional methods for securing magnets to rotors have relied upon adhesives that immobilize the magnets on the outer flange. Adhesive provides a strong bond that also permits magnetic flux between the magnets. However, adhesive rigidly bonds each magnet to the flange, thus subjecting the magnet to the strain imparted to the rotor during high-speed rotational operation. Thus, the magnets become load-bearing members subject to centrifugal stresses that potentially exceed their stress limitations. Additionally, the bonded magnets become permanently attached to the disk, making it difficult or otherwise infeasible to repair or replace them, wholly or individually, or the rotor disk. Adhesive is also susceptible to failure due to extreme temperatures, aging and chemical exposure. Therefore, there is a need for an improved system for retaining brushless PM motor and generator rotor magnets.

BRIEF SUMMARY OF THE INVENTION

The present invention is directed toward a rotor for a brushless permanent magnet generator/motor. The rotor comprises a retention slot extending into a rotor flange for receiving a root of a permanent magnet. The retention slot comprises a base extending axially into the rotor flange, a pair of side walls extending radially from the base, and a pair of lugs projecting from the side wall to engage the root to provide radial and tangential retention of the permanent magnet.

DETAILED DESCRIPTION

Figure 1:
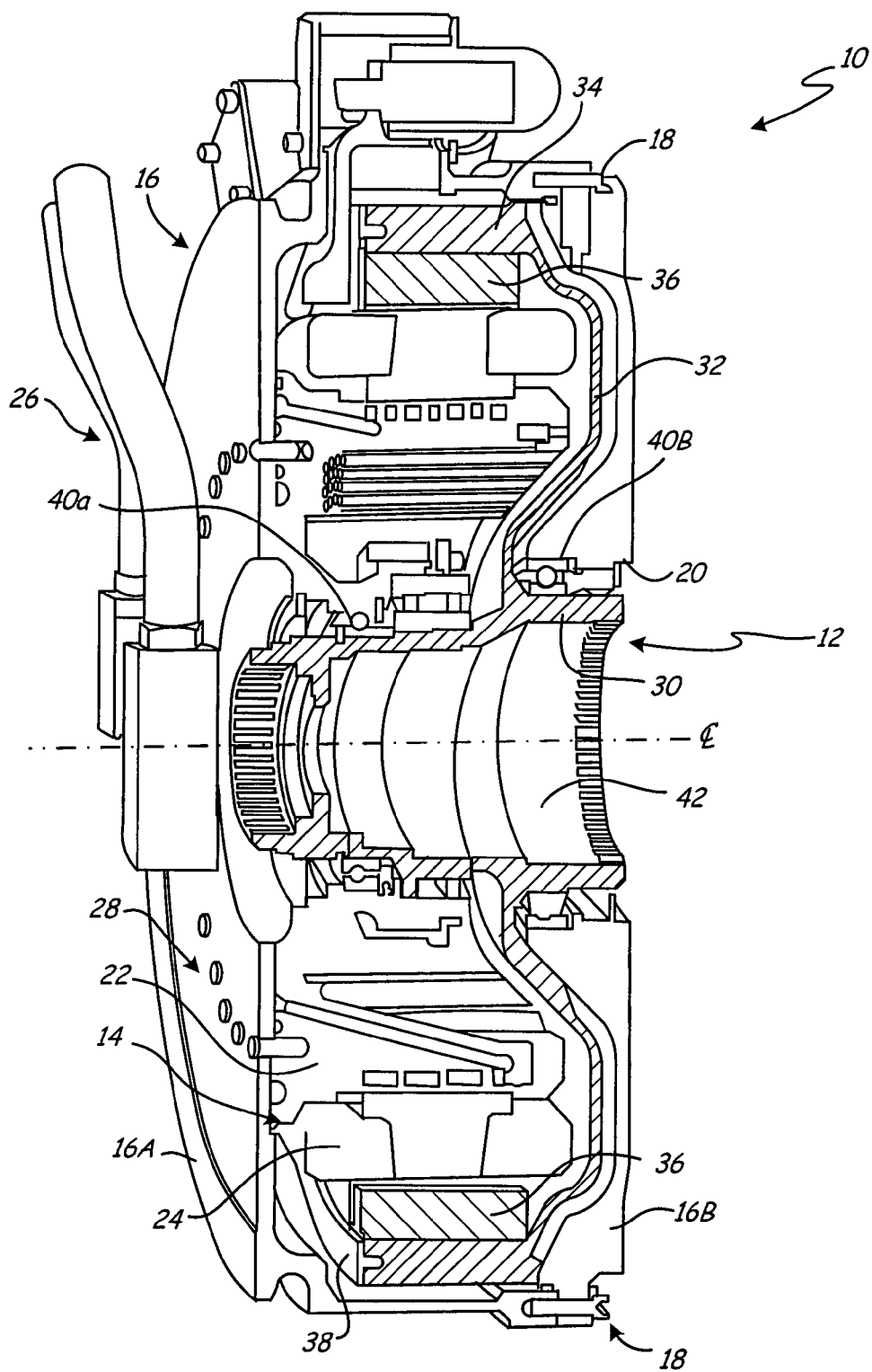
FIG. 1 shows a cross sectional view of an inside out brushless permanent magnet motor having a rotor and a stator.

FIG. 1 shows a cross sectional view of inside out brushless permanent magnet (PM) motor 10 in which the magnet retention system of the present invention is used. Although the invention is described hereinafter with respect to an inside out brushless PM motor, the invention is universally applicable to brushless PM generators and motors in both conventional and inside out configurations. Brushless PM motor 10 includes rotor 12 and stator 14, which are situated inside housing 16. Housing 16 comprises first housing half 16A and second housing half 16B, which are secured together using fasteners 18 to form a hollow annular disk having central bore 20, through which extends centerline CL.

Stator 14 comprises a plurality of wire windings wrapped around armature 22 to form circular hoop 24. Input voltage and current is supplied to armature 22 through conduits 26 such that hoop 24 produces an electromagnetic field. Armature 22 is secured to first housing half 16A through, for example, threaded fasteners 28 such that hoop 24 is maintained stationary with respect to housing 16. Armature 22 is circumferentially disposed around bore 20 such that space is provided within housing 16 between the outermost extent of housing 16 and the outermost extent of hoop 24. Armature 22 also allows space between hoop 24 and second housing half 16B such that bore 20 is connected with the space between hoop 24 and the outer extent of housing 16. Rotor 12 is situated within the open space of housing 16 such that it extends from central bore 20 past hoop 24 to interact with the electromagnetic field.

Rotor 12 is comprised of hub 30, disk 32, outer flange 34, a plurality of permanent magnets 36, and outer retention ring 38. Hub 30 is inserted into central bore 20 of housing 16 between housing half 16A and housing half 16B. Hub 30 is supported by rolling element bearings 40A and 40B such that rotor 14 is rotatable with respect to housing 16. Hub 30 includes shaft bore 42, which is concentric with centerline CL, for receiving an output shaft or some other output means.

Disk 32 extends radially from hub 30 (concentrically with centerline CL) beyond hoop 24 such that the innermost side of flange 34 faces hoop 24. Permanent magnets 36 are secured to the innermost side of flange 34 using an attachment slot of the present invention and retention ring 38 such that the magnets interact with the electromagnetic field generated by hoop 24. Hoop 24 utilizes the electrical power supplied by conduits 26 and, in conjunction with switching devices and other electrical components, produces an alternating electromagnetic field that exerts pushing and pulling forces on magnets 36. As such, magnets 36 are subjected to rotational torque such that rotor 12 rotates on hub 30 about centerline CL. The torque is transmitted through flange 34 and disk 32 to hub 30, which is connectable with an output shaft at bore 42 such that the electrical power input from conduits 26 is converted to rotational shaft power. In order to transmit the rotational torque from magnets 36 to flange 34 in a manner that permits non-destructive removal of magnets 36, magnets 36 are joined with flange 34 through slotted attachments of the magnet retention system of the present invention.

Figure 2:
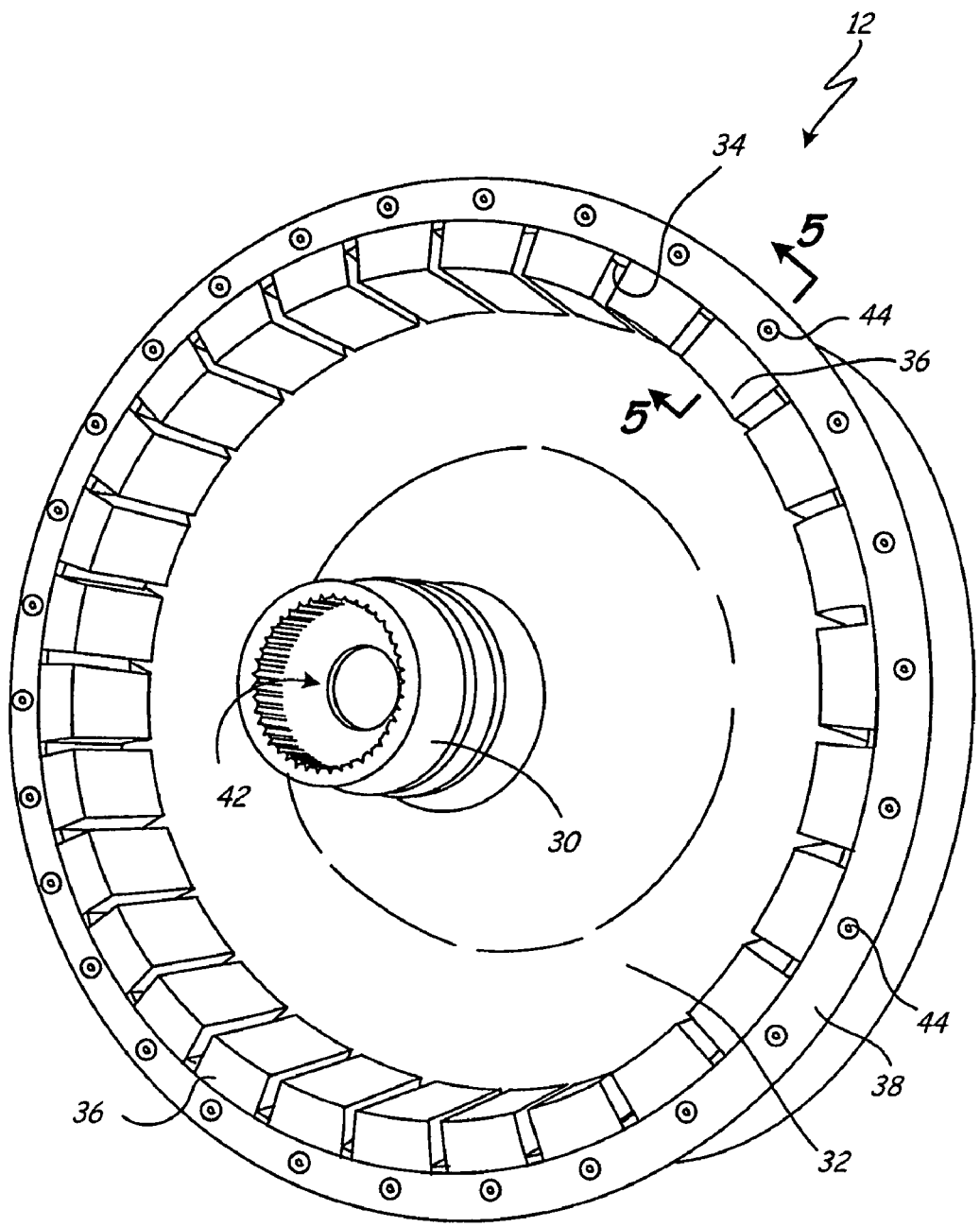
FIG. 2 shows a perspective view of the rotor of FIG. 1 having a magnet retention system of the present invention.

FIG. 2 shows a perspective view of rotor 12 of FIG. 1 having the magnet retention system of the present invention. Rotor 12 includes hub 30, disk 32, outer flange 34, a plurality of permanent magnets 36, outer retention ring 38 and center bore 42. Hub 30 and flange 34 extend axially outward from disk 32 in the same direction such that hoop 24 of stator 14 can be inserted between flange 34 and hub 30 within housing 16 in a compact manner. Hub 30 is disposed at the center of rotor 12 and includes bore 42 such that rotational torque applied to rotor 12 can be transmitted to a shaft or some other output means. Rotational torque is transmitted to hub 30 through disk 32 from flange 34. Flange 34 receives input torque from the plurality of permanent magnets 36, disposed about the inner circumference of flange 34. Rotational torque is imparted to the permanent magnets through an alternating electromagnetic field generated by hoop 24. In order to prevent excessive stress from being generated in the permanent magnets during torque transmission, a slotted magnet retention system is used to transmit the torque from the permanent magnets to flange 34.

Flange 34 extends circumferentially around the outermost diameter edge of disk 32 and provides a platform onto which permanent magnets 36 can be mounted such that they face hoop 24 of stator 14. In the embodiment shown, rotor 12 includes twenty-eight permanent magnets that are displaced at regular intervals along flange 34. Permanent magnets 36 are mounted to flange 34 through correspondingly shaped retention features to restrain the magnets radially and tangentially. For example, for each magnet 36, flange 34 includes a broach slot into which a magnet tang having a matching profile is inserted. Once inserted, the broach slot/tang interface restricts circumferential and radial movement of the permanent magnets within flange 34. The broach slot/tang interface also permits efficient torque transmission from the permanent magnets to flange 34 without over stressing the magnets. In other embodiments, flange 34 includes a tang for receiving a correspondingly shaped broach slot on each magnet 36. A shoulder positioned at the inner end of the broach slot and retention ring 38 positioned at the outer end of the broach slot restrict axial movement of the permanent magnets. Retention ring 38 is secured to flange 34 using fasteners (such as fastener 44) such that ring 38 is repeatably attached and removed from rotor 12. Accordingly, permanent magnets 36 are attached to flange 34 in stress-free manner, and can be removed from flange 34 without causing damage to either rotor 12 or the magnets.

Figure 3:
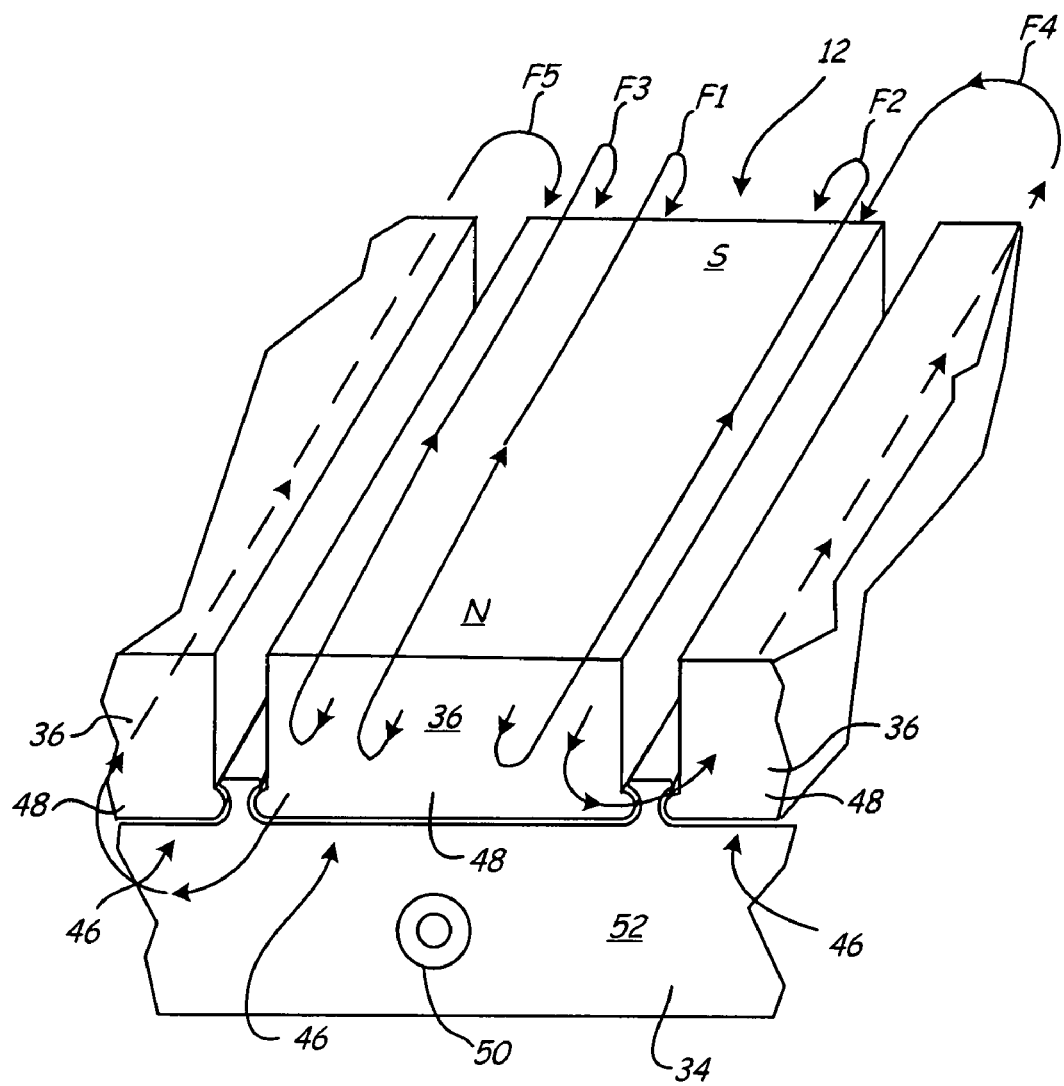
FIG. 3 shows a perspective view of a broach slot connection of the magnet retention system of FIG. 2.

FIG. 3 shows a front projection view of the magnet retention system of FIG. 2 showing the connection between magnet retention flange 34 and permanent magnets 36. Rotor 12 includes magnet retention flange 34, to which magnets 36 are connected through a slotted interface. Flange 34 includes broach slots 46 for receiving magnet tangs 48 of magnets 36. Tangs 48 are inserted into slots 46 such that magnets 36 are restrained from moving in both the tangential and radial directions. However, broach slots 46 are also configured such that a magnetic flux path is maintained from magnet to magnet.

Permanent magnets 36 include flux lines F1, F2, F3, F4 and F5, which extend from north pole N to south pole S. Each flux line emits from pole N and returns at pole S. Adjacent flux lines repulse each other such that the flux lines form an outer flux boundary circumscribing each magnet. Each magnet includes a plurality of magnetic flux lines that interact with neighboring magnets and rotor 12. For example, flux line F1 extends from the center of each magnet at pole N and bends around the magnet toward pole S. Flux line F1 extends out of the magnet toward centerline CL (FIG. 1) of rotor 12. Thus, flux line F1 will interact with stator 14 of motor 10. Similarly, each magnet includes a plurality of other flux lines, such as flux lines F2 and F3, that extend from pole N to pole S at various angles to interact with stator 14. Flux lines F4 and F5 extend in the plane of each magnet to interact with permanent magnets on either side of each magnet. Thus, each magnet is positioned on flange 34 of rotor 12 such that it is remains in magnetic contact with hoop 24 when assembled with stator 14. Additionally, each broach slot is disposed along flange 34 such that each magnet is in magnetic contact with two adjacent magnets to complete a magnet flux path around the circumference of rotor 12. Consequently, during operation of motor 10, rotor 12 is able to maintain the requisite electromagnetic interaction with hoop 24 of stator 14 to maintain rotational torque transmission to hub 30.

As mentioned above, tangs 48 are inserted into slots 46 such that magnets 36 are restrained from moving in both the tangential and radial directions. An inner retention shoulder prevents axial movement of magnets 36 toward disk 32, and retention ring 38 (shown in FIG. 2) is secured to flange 34 at bore 50 to restrain outward axial movement of magnets 36. Flange 34 is configured to provide radial retention to each magnet through the interaction of tangs 48 with slots 46.

Figure 4:
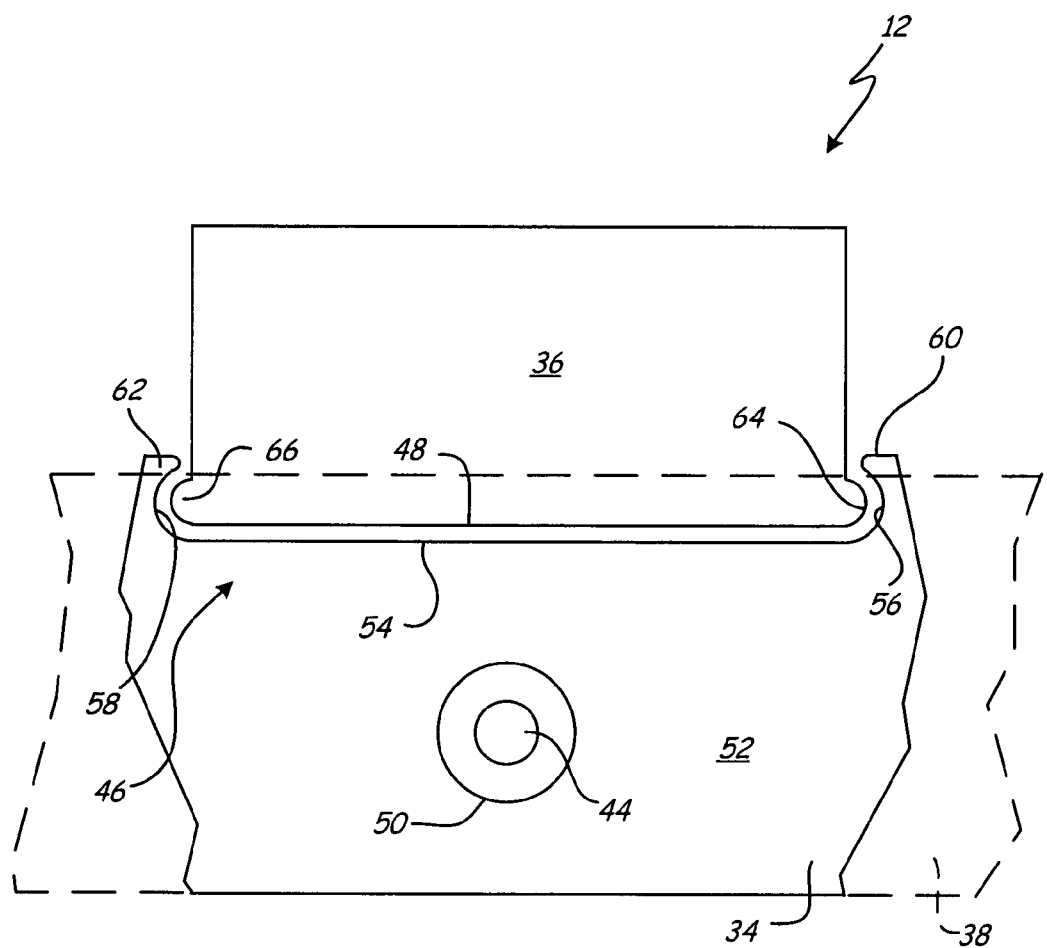
FIG. 4 shows a front view of the connection between the broach slot of FIG. 3 and a permanent magnet tang.

FIG. 4 shows tang 48 of magnet 36 inserted into broach slot 46 as shown in FIG. 3. Magnet retention flange 34 includes first flange face 52, into which broach slot 36 extends perpendicularly. Rotor 12 rotates about centerline CL of motor 10 such that magnet retention flange 34 would rotate in the plane of FIG. 3. Broach slot 46 includes base 54, first side wall 56, second side wall 58, first side tooth 60 and second side tooth 62. Broach slot 46 extends axially (parallel with centerline CL) into magnet retention flange 34 of rotor 12 such that it opens towards centerline CL. Broach slot 46 extends axially into first face 52 to form base 54. First side wall 56 and second side wall 58 extend radially (perpendicular with centerline CL) from base 54. First side tooth 60 and second side tooth 62 extend in the tangential or circumferential direction from first side wall 56 and second side wall 58, respectively. First side tooth 60 and second side tooth 62 overhang base 54 to narrow a segment of broach slot 46 that is radially displaced from base 54.

Magnet 36 includes tang 48, which generally refers to the portion of magnet 36 situated below first side tooth 60 and second side tooth 62. Magnet 36 also includes first tang tooth 64 and second tang tooth 66 that extend in the tangential or circumferential direction out from tang 48. Tang 48 of magnet 36, including first tang tooth 64 and second tang tooth 66, is shaped to match the shape of broach slot 46. In the embodiment shown, broach slot 46 comprises a T-shaped slot and side walls 56 and 58 comprise rounded walls. Correspondingly, teeth 64 and 66 comprise rounded nubs having a profile matching that of side walls 56 and 58. In other embodiments of the present invention, broach slot 46 and tang 48 comprise different shapes. Teeth 64 and 66 can comprise any shape for interlocking with the side walls 56 and 58 and teeth 60 and 62 of slot 46. For example, slot 46 and tang 48 can comprises a fir tree type configuration as is commonly used in gas turbine engines to radially retain blades in a rotor disk.

Magnet 36 is inserted into broach slot 46, such that first side tooth 60 overhangs first tang tooth 64, and second side tooth 62 overhangs second tang tooth 66 to prevent magnet 36 from breaking loose during operation of motor 10. Although tang 48 is shaped to match the shape of broach slot 46, a small amount of slop or play is permitted in the interaction between tang 48 and slot 46 to avoid producing stress concentrations in magnet 36 during operation of motor 10. (The space shown between tang 48 and slot 46 in FIG. 3 is exaggerated for illustrative purposes.) During operation of motor 10, rotor 12 is subjected to rotational forces by the electromagnetic field generated by stator 14. Typically, motor 12 rotates at high enough speeds such that rotor 12 is subjected to considerable centrifugal force. In an inside out configuration motor, such as that of motor 10, the centrifugal force tends to open up slot 46, causing teeth 60 and 62 to grow apart. As such, during operation of motor 10, magnet 36 is forced outward while teeth 60 and 62 are forced apart.

Side teeth 60 and 62 overhang tang teeth 64 and 66 by a sufficient length to avoid the possibility of magnet 36 radially dislodging from slot 46. While motor 10 operates at speed, magnet 36 is held in place by frictional force generated between magnet 36 and rotor flange 34. This frictional force is proportional to the centrifugal force acting on rotating magnets 36. In one embodiment, first side tooth 60 overhangs first tang tooth 64 by a length greater than about the distance first side tooth 60 grows away from second side tooth 62 during operation of motor 10. Likewise, second side tooth 62 overhangs second tang tooth 66 by a length greater than about the distance first side tooth 60 grows away from second side tooth 62 during operation of motor 10. Additionally, to avoid fracturing of magnet 36, slot 46 is slightly oversized such that any twisting or bending of rotor 12 during operation of motor 10 does not transmit stress to magnet 36. Magnet 36 is permitted free movement within slot 46 such that teeth 60 and 62 are prevented from pulling on teeth 64 and 66 as broach slot 46 tends to open up during operation. Magnet 36 is thus ultimately restrained from exiting slot 46, however, is not rigidly attached to rotor 12. Thus, unnecessary production of tensile or compressive stress in magnet 36 is avoided.

Additionally, tang 48 is configured to transmit torque to flange 34 of rotor 12. Magnet 36 is subjected to rotational forces by the alternating electromagnetic field generated by stator 14. The force of the applied field is transmitted from magnet 36 through flange 34 and to hub 30 such that useful rotational output can be obtained. Teeth 64 and 66 interact with wall 56 and 58, respectively, to efficiently transmit torque from magnet 36 to flange 34. As described above, teeth 64 and 66 comprise rounded projections such that they mesh with rounded walls 60 and 62. Thus, the tangential component of the rotational force applied to magnet 36 is effectively transmitted to broach slot 46. Thus, little energy is lost in the transmission of torque from magnet 36 to broach slot 46, and rotor 12 is efficiently rotated.

Thus, tang 48 is loosely fit within broach slot to restrain movement of magnet 36 in the radial direction 46, to prevent stress build up in magnet 36, and to transmit torque to flange 34. Rotor 12 is fitted with other restraints for preventing axial withdrawal of magnet 36 from slot 46 during operation of motor 10. Ring 38 (shown in phantom in FIG. 4), which is secured to bore 50 of flange 34 by fastener 44, provides a barrier strip spanning the distance between teeth 60 and 62 to prevent axial dislodgment of magnet 36.

Figure 5:
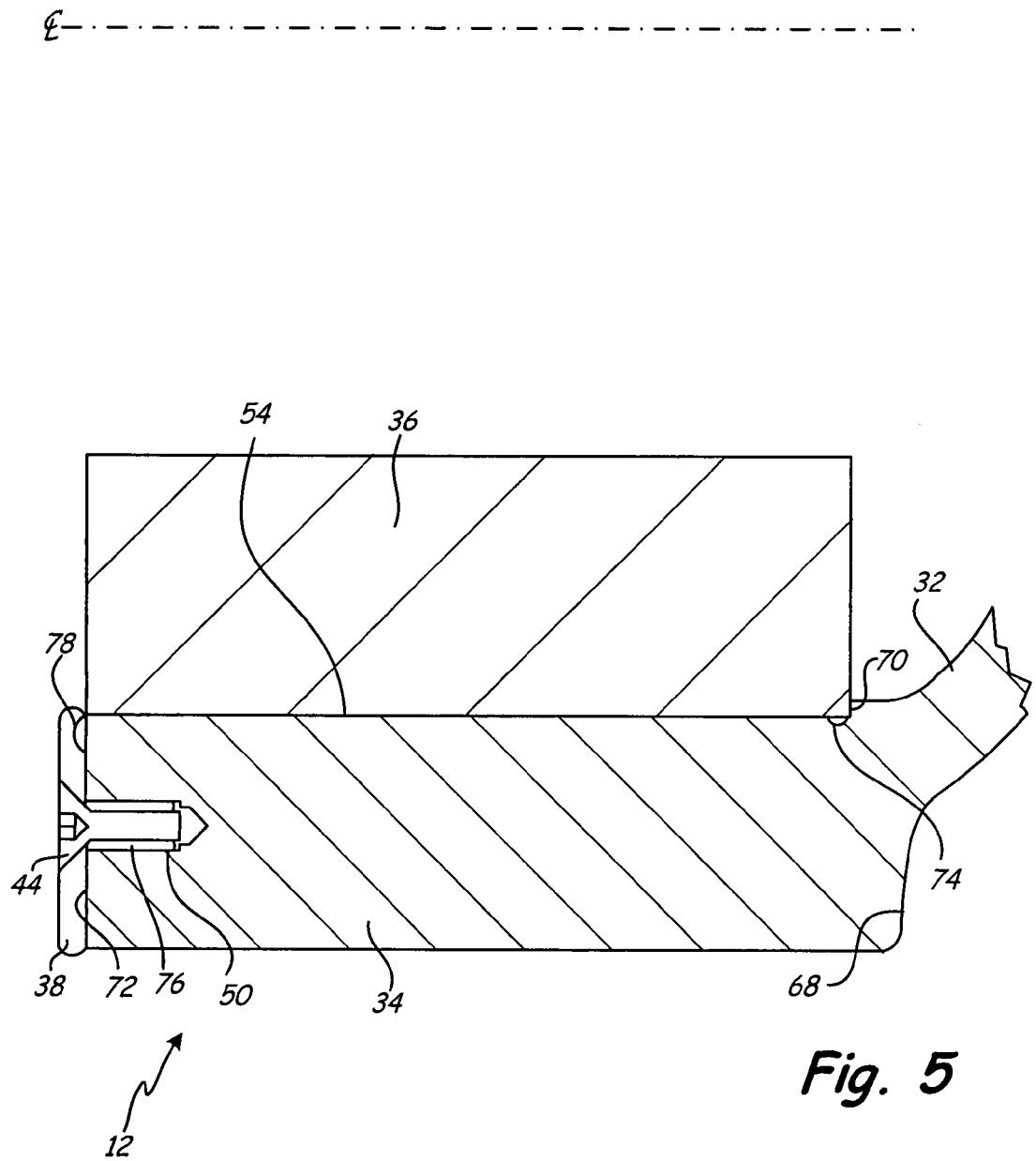
FIG. 5 shows a cross sectional view of the magnet retention system of FIG. 2 showing inner and outer axial retention means.

FIG. 5 shows a cross sectional view of the magnet retention system of the present invention as taken along section 5-5 of FIG. 2, showing inner and outer axial retention means. Rotor 12 includes magnet retention flange 34, which extends parallel to centerline CL from disk 32 at first side 68, which includes inner axial retention shoulder 70. Flange 34 extends from first side 68 to second side 72, to which outer axial retention ring 38 is attached. Flange 34 also includes fastener 44, fastener bore 50, base 54 of broach slot 46, stress relief notch 74 and bushing 76. Magnet 36 is secured between shoulder 70 and ring 38 to restrain axial movement of magnet 36, e.g. in the direction of centerline CL.

Permanent magnet 36 is inserted into broach slot 46 at second side 72 such that it extends along base 54. Magnet 36 is inserted into slot 46 such that it contacts inner retention shoulder 70. Inner retention shoulder 70 extends around the circumference of flange 34 between first side 68 and second side 72. Inner retention shoulder comprises a lip or a barrier to prevent magnet 36 from sliding through broach slot 46 once inserted. Stress relief notch 74 is provided between shoulder 70 and base 54 to prevent stress concentration from occurring in flange 34 during high speed rotation of rotor 12.

After magnet 36 is inserted into broach slot 46 to meet shoulder 70, outer retention ring 38 is affixed to second side 72 to prevent magnet 36 from retreating out of slot 46. Outer retention ring 38 covers side 72 and extends over a lower portion of magnet 36. Ring 38 is secured to flange 34 by threaded fastener 44, which extends through an opening in ring 38 and into bore 50. Bore 50 includes self-locking helical coil insert 76, into which fastener 44 is threaded. Ring 38 includes notch 78 that enables the inner diameter of ring 38 to act as a spring-like element. Thus, when ring 38 is fastened to flange 34, the inner diameter of ring 38 pre-loads magnet 36 such that it is biased against shoulder 70. Notch 78 also permits ring 38 to span any variance in the alignment of second side 72 and magnet 36 such that ring 38 will be pulled flush with magnet 36. Thus, ring 38 is prevented from applying pressure directly to the edge of magnet 36, where stress concentration can readily produce fracture of magnet 36.

As explained above, magnet 36 is maintained within flange 34 such that it is able to magnetically interact with adjacent magnets and the coil winding of stator 14 during operation of motor 12. Shoulder 70, ring 38, and broach slot 46 immobilize magnet 36 within flange 34 without overstressing magnet 36. Thus, the incidence of fracture of magnet 36 is greatly reduced with the retention system of the present invention. However, due to extreme operating conditions of motor 10, rough handling of rotor 12, or other such similar occurrences, it is possible that magnet 26B may become damaged. The magnet retention system of the present invention, as described above, provides a means for removing the permanent magnets from rotor 12. Magnets can be removed from flange 34 by simply removing ring 38 after unthreading fastener 44. Individual magnets can be removed without damaging adjacent or other magnets, or without damaging rotor 12. Individual magnets are therefore easily removed such as might be required for replacement if the magnet becomes damaged or demagnetized, or simply for maintenance or cleaning. Thus, the present invention provides a magnet retention system that reduces the incidence of magnet breakage and provides improved maintenance capabilities.

Although the invention has been described with respect to flange 34 having broach slots and magnets 36 having tangs, other configurations of the magnet retention system of the present invention can also be used. For example, in another embodiment, magnets 36 can be configured with broach slots, and flange 34 can be configured with mating tangs. In other embodiments, magnets 36 and flange 34 include mating male and female components that have correspondingly shaped geometric profiles to restrain radial and tangential movement of magnets 36 with respect to rotor 12.

Although the present invention has been described with reference to preferred embodiments, workers skilled in the art will recognize that changes may be made in form and detail without departing from the spirit and scope of the invention.

The invention claimed is:

1. A rotor for use in a permanent magnet generator or motor, the rotor comprising:
    a hub having an axially extending bore for receiving a shaft;
    a disk extending radially from the hub;
    a magnet retention flange projecting axially from the disk, the flange including a plurality of axially extending retention slots intermittently displaced around a circumference of the flange; and
    a plurality of permanent magnets having permanent magnet retention features, wherein the permanent magnet retention features have a shape corresponding to that of the retention slots such that the retention features can be interlocked with the retention slots to restrain radial and tangential movement of the plurality of permanent magnets, but axial movement of the plurality of permanent magnets in the retention slots is uninhibited by the retention slots;
    wherein the retention slots and the retention features have uniform cross-sectional profiles in an axial direction.

2. The rotor of claim 1 wherein:
    the retention slots comprise broach slots, each having a pair of opposing circumferential channels extending across an entire length of each broach slot; and
    the permanent magnet retention features comprise correspondingly shaped tangs, each having a pair of opposing circumferential teeth extending across an entire length of each tang such that the permanent magnets can be axially slid into the broach slots.

3. The rotor of claim 2 wherein the magnet retention flange comprises:
    a first side face connected to the disk and through which the broach slots extend in the axial direction;
    a second side face axially disposed from the first side face such that the magnet retention flange is cantilevered over the hub, the broach slots extending through the second side face in the axial direction;
    a first slot face disposed between the first side face and the second side face through which the broach slots extend in a radial direction; and
    a second slot face disposed between the first side face and the second side face to bound the broach slots in the radial direction.

4. The rotor of claim 3 wherein the broach slots face toward and open to the hub in the radial direction such that the plurality of permanent magnets are disposed on a radially inner face of the magnet retention flange.

5. The rotor of claim 3 wherein the magnet retention flange includes an inner retention shoulder disposed between the first side face and the second side face for providing only axial retention of the plurality of magnets.

6. The rotor of claim 5 and further comprising an outside retention ring disposed around the circumference of the second side face and for restraining only axial movement of the plurality of magnets.

7. The rotor of claim 6 wherein the outside retention ring is removable such that the plurality of permanent magnets are repeatably and non-destructively removable from the flange retention features.

8. The rotor of claim 6 wherein the outside retention ring includes a biasing spring element to pre-load the plurality of permanent magnets in an axial direction.

9. The rotor of claim 3 wherein each broach slot of the plurality of broach slots comprises:
    a slot floor extending axially into the second side face to form a base along an entire length between the first and second side faces of the flange;
    a pair of side slot walls extending radially from the base and extending axially along the entire length between the first and second side faces of the flange; and
    a pair of radial retention flanges extending circumferentially from the side slot walls over an entire length of the base to form the circumferential channels.

10. The rotor of claim 9 wherein the pair of radial retention flanges engage with a magnet tang by a circumferential length greater than a circumferential expansion length of the rotor under loading.

11. The rotor of claim 9 wherein the plurality of broach slots each comprise T-shaped cross-sectional profiles extending in the axial direction and the plurality of magnet tangs each have profiles matching that of the T-slot.

12. The rotor of claim 1 wherein the plurality of flange retention features are spaced around the circumference of the flange such that a magnetic flux path is maintained between the plurality of permanent magnets.

13. A rotor for use in a brushless permanent magnet generator or motor, the rotor comprising:
    a permanent magnet comprising:
        a main body for producing a magnetic field;
        a tang extending radially from the main body and for attaching the permanent magnet to the rotor; and
        a pair of tang teeth extending circumferentially from the tang; and
    an annular body configured for rotation around an axis of the generator or motor, the body comprising:
        a coupling at an inner diameter of the body and for joining the body to an input/output shaft;
        a magnet retention flange at an outer diameter of the body; and
        a first slot extending axially into and through the retention flange to receive the tang and the pair of tang teeth such that radial movement of the permanent magnet is restricted, but axial movement of the permanent magnet is not.

14. The rotor of claim 13 wherein the first slot is disposed on the magnet retention flange such that the slot opens toward and faces the coupling such that the permanent magnet has a line of sight of the coupling in a radial direction for use in an inside out generator/motor configuration.

15. The rotor of claim 13 wherein the first slot includes an inner retention shoulder for restricting only axial movement of the permanent magnet.

16. The rotor of claim 15 and further comprising a spring-biased outer retention ring affixed to an outward facing surface of the flange and for providing only axial retention of the permanent magnet.

17. The rotor of claim 13 wherein the first slot comprises:
a base extending axially into and through the retention flange to bound the first slot radially;
a pair of side walls extending radially from the base to bound the first slot tangentially; and
a pair of radial retention slot teeth extending from the side walls and overhanging the base to engage the tang teeth to prevent radial displacement of the permanent magnet.

18. The rotor of claim 17 wherein the pair of radial retention slot teeth engage with the pair of tang teeth of the permanent magnet to inhibit radial displacement of the permanent magnet after the rotor expands under centrifugal forces applied to the rotor during operation of the generator or motor.

19. The rotor of claim 13 wherein magnet retention flange includes a second slot disposed circumferentially from the first slot along the flange such that a magnetic flux path is maintained between permanent magnets inserted in the first slot and the second slot.

20. The rotor of claim 13 wherein the first slot comprises a fir tree configuration.

21. A rotor for a permanent magnet generator/motor that rotates about an axial direction, the rotor comprising:
a retention slot extending into a rotor flange and for receiving a root of a permanent magnet, the retention slot comprising:
a base extending axially into and through the rotor flange to bound the retention slot in a first radial direction such that movement of a permanent magnet root inserted into the slot is restricted in the first radial direction;
a pair of side walls extending radially from an entire length of the base to bound the first slot in first and second tangential directions such that movement of a permanent magnet root inserted into the slot is restricted in the first and second tangential directions; and
a pair of lugs projecting tangentially from entire lengths of the side walls to overhang the base such that movement of a permanent magnet root inserted into the slot is restricted in the a second radial direction;
wherein the retention slot has a uniform cross-sectional profile in the axial direction such that axial movement of a permanent magnet root inserted into the slot is unrestricted.

22. The attachment slot of claim 21 and further comprising a spring-biased outside retention strip extending across the pair of side walls for providing only axial retention of the permanent magnet root in the dovetail slot, and wherein the retention strip is removable such that a permanent magnet is repeatably and non-destructively removable from the dovetail slot.

23. The attachment slot of claim 22 wherein the dovetail slot includes an inner retention shoulder for restricting only axial movement of the permanent magnet.

24. The attachment slot of claim 21 wherein the pair of lugs are engagable with a magnet tang of a permanent magnet to inhibit radial displacement of the permanent magnet after the rotor expands under centrifugal forces applied to the rotor during operation of the generator or motor.

25. The attachment slot of claim 21 wherein the pair of side walls and the pair of lugs are configured to:
permit circumferential torque transmission from the permanent magnet to the rotor; and
permit slop in the tangential and radial retention between the permanent magnet and the rotor.

* * * * *